United States Patent
Takahama et al.

(10) Patent No.: US 6,303,229 B2
(45) Date of Patent: Oct. 16, 2001

(54) HYDROPHILIC INORGANIC COATING FILM AND COMPOSITION MADE FROM ALKOXYSILANE AND SILICA

(75) Inventors: Koichi Takahama, Amagasaki; Minoru Inoue, Katano; Junko Ikenaga, Ikeda; Shoichi Nakamoto, Neyagawa, all of (JP)

(73) Assignee: Matsushita Electric Works, Ltd., Osaka-fu (JP)

( * ) Notice: Subject to any disclaimer, the term of this patent is extended or adjusted under 35 U.S.C. 154(b) by 0 days.

(21) Appl. No.: 09/445,350

(22) PCT Filed: Apr. 12, 1999

(86) PCT No.: PCT/JP99/01928

§ 371 Date: Dec. 8, 1999

§ 102(e) Date: Dec. 8, 1999

(87) PCT Pub. No.: WO99/52986

PCT Pub. Date: Oct. 21, 1999

(30) Foreign Application Priority Data

Apr. 10, 1998 (JP) .................................. 10-098670

(51) Int. Cl.⁷ ................. B32B 9/04; B05D 7/24
(52) U.S. Cl. .................. 428/447; 427/503; 427/515; 427/387
(58) Field of Search .................... 427/503, 515, 427/387, 419.8; 428/447

(56) References Cited

U.S. PATENT DOCUMENTS

| | | | |
|---|---|---|---|
| 5,514,211 | * | 5/1996 | Marks et al. ........................ 427/384 |
| 5,800,606 | * | 9/1998 | Tanaka et al. .................. 106/287.16 |
| 6,013,372 | | 1/2000 | Hayakawa et al. ............... 428/411.1 |

FOREIGN PATENT DOCUMENTS

| | | |
|---|---|---|
| 61-83106 | 4/1986 | (JP) . |
| 6-505282 | 6/1994 | (JP) . |
| 6505282 | 6/1994 | (JP) . |
| 9-176527 | 7/1997 | (JP) . |
| 9176527 | 7/1997 | (JP) . |
| 95/17349 | 6/1995 | (WO) . |
| 9517349 | 6/1995 | (WO) . |
| 96/29375 | 9/1996 | (WO) . |

OTHER PUBLICATIONS

Hawley's Condensed Chemical Dictionary, Thirteeth Edition, Revised by Richard J. Lewis, Sr., Van Nostrand Reinhold, p. 288, 1997 (No Month Date).*

* cited by examiner

Primary Examiner—Katherine A. Bareford

(57) ABSTRACT

The present invention provides a process for forming a hydrophilic inorganic coated film on a surface of a base material, the process comprising the steps of: (1) preparing an inorganic coating composition which contains, as a major component, a silicone resin obtained by hydrolyzing and condensation-polymerizing only the tetra-functional alkoxysilane represented by the formula: $Si(OR)_4$ [wherein R represents an alkyl group having carbon atoms up to and including 7 or an aryl group], and has a total solid content of not more than 5% by weight; (2) applying the inorganic coating composition to a surface of the base material to form a coated layer; and (3) drying and curing the coated layer to form a cured coated film having a thickness of 0.01 to 0.5 $\mu$m. The hydrophilic inorganic coated film formed by the process of the present invention is highly hydrophilic just after the film is formed, even in the case that it is not irradiated with ultraviolet rays.

10 Claims, No Drawings

HYDROPHILIC INORGANIC COATING FILM AND COMPOSITION MADE FROM ALKOXYSILANE AND SILICA

This application is the national phase under 35 U.S.C. §371 of PCT International Application No. PCT/JP99/01928 which has an International filing date of Apr. 12, 1999, which designated the United States of America.

TECHNICAL FIELD OF THE INVENTION

The present invention relates to a process for forming a hydrophilic inorganic coated film having high fogging resistance, staining resistance, weather resistance, and durability on a surface of the exterior of a building, a display panel, a vehicle and a glass material, and to an inorganic coating composition for use in this process.

BACKGROUND OF THE INVENTION

In recent years, an attempt to impart high hydrophilicity to a surface of a product has been made, in order to preventing the surface of glass or mirror from fogging, or to automatically remove the stains, adsorbed to the surface of an outdoor building, by the aid of rain water.

Methods for imparting high hydrophilicity to a surface of a product are disclosed, for instance, in Japanese Patent Application Laid-Open (JP-A) No. S61-83106 and WO96/29375. These methods described there are all characterized in that an inorganic coated film containing a photo-semiconductor material, e.g., titanium oxide is formed on a surface of a product, and the photocatalytic action of the photo-semiconductor material is utilized.

The photocatalytic action of a photo-semiconductor material means the action of decomposing organic substances, etc. present there as the result of redox reaction which is produced on the surface of the photo-semiconductor material when the light (ultraviolet rays) with excitation wavelength (for example, 400 nm) is applied to the photo-semiconductor material. Organic substances are generally hydrophobic. Hence, when these organic substances are decomposed and removed, the surface of the photo-semiconductor material becomes hydrophilic. As a result, the contact angle of water to the surface of the coated film becomes low, and the surface of the coated film tends to get wet (familiar with water).

However, it takes a certain period of time to develop the photocatalytic action of the photo-semiconductor material after it is irradiated with ultraviolet rays. Therefore there are the problems of, for instance, that the coated surface does not become hydrophilic, and tends to fog and stain for a certain fixed time after the film is formed. Also, there is, for instance, the problem of that it takes a longer period of time to develop the photocatalytic action at the place that is scarcely irradiated with ultraviolet rays, and the use of the photo-semiconductor materials is limited to the applications at which ultraviolet rays is easily applied.

SUMMARY OF THE INVENTION

The present invention solves such conventional problems and has the object of providing a process for forming a hydrophilic inorganic coated film, and an inorganic coating composition for use in the process. The surface of the coated film exhibits high hydrophilicity even just after the film is formed and even when ultraviolet rays is scarcely applied.

The present invention provides a process for forming a hydrophilic inorganic coated film on a surface of a base material, the process comprising the steps of:

(1) preparing an inorganic coating composition which contains, as a major component, a silicone resin obtained by hydrolyzing and condensation-polymerizing only the tetra-functional alkoxysilane represented by formula (I):

$$Si(OR)_4 \qquad (I)$$

[wherein R represents an alkyl group having carbon atoms up to and including 7 or an aryl group], and has a total solid content of not more than 5% by weight;

(2) applying the inorganic coating composition to a surface of the base material to form a coated layer; and (3) drying and curing the coated layer to form a cured coated film having a thickness of 0.01 to 0.5 μm.

The present invention also provides an inorganic coating composition which contains, as a major component, a silicone resin and is used to form a hydrophilic inorganic coated film by applying itself to a surface of a base material, followed by drying and curing, wherein the silicone resin is obtained by hydrolyzing and condensation-polymerizing only the tetra-functional alkoxysilane represented by formula (I);

the total solid content of the inorganic coating composition is not more than 5% by weight; and the film thickness of the hydrophilic inorganic coated film is 0.01 to 0.5 μm.

DETAILED DESCRIPTION OF THE INVENTION

The present invention relates to a process for forming a hydrophilic inorganic coated film on a surface of a base material by applying an inorganic coating composition containing a silicone resin as its major component to the surface of a subject product, followed by drying and curing. Hydrophilicity of the surface of the hydrophilic inorganic coated film formed according to the process of the present invention is exhibited just after the film is formed, and no irradiation with ultraviolet rays is needed to develop the hydrophilicity.

The silicone resin is a binder component for the inorganic coating composition and is also a component which primarily imparts durability and strength to the coated film to be formed and hydrophilicity (water-wettability) to the surface of the coated film to provide fogging resistance and staining resistance by the aid of the rain water cleaning.

The silicone resin is a polysiloxane formed by hydrolyzing and condensation-polymerizing only tetra-functional alkoxysilane as a polymerizable component. Using only the tetra-functional alkoxysilane as a polymerizable component implies that any tri- or less-functional alkoxysilane is not contained. If the tri- or less-functional alkoxysilane is added as a polymerizable component, performances of the coated film, such as hydrophilicity, fogging resistance, staining resistance by the aid of the rain water cleaning, weather resistance, durability and strength, of the coated film to be formed are impaired. The form of the silicone resin in the inorganic coating composition is not limited to, but for example, may be the form of a solution or dispersion solution.

The silicone resin is contained as a major component in the inorganic coating composition. The meaning of the major component is that the silicone resin is present in an amount of 50 to 100% by weight in a solid of the inorganic coating composition. The amount of the silicone resin present in a solid of the inorganic coating composition is preferably 50 to 80% by weight and more preferably 50 to 70% by weight.

The tetra-functional alkoxysilane preferable as a raw material of the silicone resin is those having the structure represented by formula (I). In formula (I), R is preferably at least one type selected from the group consisting of a methyl group, ethyl group, propyl group, isopropyl group, butyl group, isobutyl group, t-butyl group and phenyl group.

Specific examples of the tetra-functional alkoxysilane include tetraalkoxysilane such as tetramethoxysilane, tetraethoxysilane, tetra n-propoxysilane, tetraisopropoxysilane and tetra-t-butoxysilane. These tetra-functional alkoxysilane are used either singly or in combinations of two or more.

The inorganic coating composition may include various functional components other than the silicone resin for the convenience of film-forming operation and for imparting various functions to the film to be formed. Such functional components include curing catalysts, fillers, photo-semiconductor materials, colorants, film-forming adjuvants, application adjuvants, antioxidants and ultraviolet absorbers.

The inorganic coating composition may further include a curing catalyst for promoting the curing of the applied layer by promoting condensation reaction of the silicone resin. Examples of the curing catalyst include, but is not limited to, alkyl titanates; metal carboxylates such as tin octylate, dibutyltin dilaurate and dioctyltin dimaleate; amine salts such as dibutylamine-2-hexoate, dimethylamine acetate and ethanolamine acetate; quaternary ammonium carboxylates such as tetramethylammonium acetate; amines such as tetraethylpentamine, amine type silane coupling agents such as N-β-aminoethyl-γ-aminopropyltrimethoxysilane and N-β-aminoethyl-γ-aminopropylmethyldimethoxysilane; acids such as p-toluenesulfonic acid, phthalic acid and hydrochloric acid; aluminum compounds such as aluminum alkoxide and aluminum chelate; alkali metal salts such as lithium acetate, potassium acetate, lithium formate, sodium formate, potassium phosphate and potassium hydroxide; titanium compounds such as tetraisopropyl titanate, tetrabutyl titanate and titanium tetraacetyl acetonate; and silane halides such as methyltrichlorosilane, dimethyldichlorosilane and trimethylmonochlorosilane. However, the materials other than the above compounds may be employed insofar as they are effective to promote condensation reaction of the silicone resin.

When the inorganic coating composition comprises the curing catalyst, the amount of the curing catalyst is not more than 10 parts by weight, and more preferably not more than 8 parts by weight for 100 parts by weight of the silicone resin on the solid basis. When the amount exceeds 10 parts by weight, the preserving (storing) stability of the inorganic coating composition may become poor.

The inorganic coating composition may comprise fillers (film-forming adjuvant) such as silica for increasing the hardness of the cured coating to be formed and improving smoothness and crack resistance. As the silica, well-known materials may be used.

Incidentally, it is preferable that silica is dispersed in the form of colloidal silica in a reaction solvent used in the preparation of the silicone resin and is introduced in the coating composition as it is in view of the film-forming capability and simplification of the process. This method is not limited to, but for instance, may be that silica is added to the silicon resin prepared without silica, and the resulting mixture is introduced into the coating; or silica may be introduced into the coating separately from the silicone resin.

The form of silica when it is introduced into the coating is not limited to, but for instance, the form of either powder or colloidal silica may be used. Examples of the colloidal silica include, but is not limited to, the water dispersion colloidal silica or the organic solvent dispersion colloidal silica of nonaqueous type such as alcohol type. In general, such colloidal silica contains solid silica in an amount of 20 to 50% by weight, from which the combination amount of silica can be determined.

It is to be noted that when the water dispersion colloidal silica is used, water present as a component other than a solid in the colloidal silica can be used to hydrolyze the tetra-functional alkoxysilane, which is a raw material of the silicone resin (the amount of this water is added to the amount of water described below required for hydrolysis) and can also be used as a curing agent for the inorganic coating composition.

The water dispersion colloidal silica is usually made from water glass and is commercially available easily. Also, the organic solvent dispersion colloidal silica can be easily prepared if an organic solvent is used in place of the water used to produce the aforementioned water dispersion colloidal silica. Such an organic solvent dispersion colloidal silica is commercially available easily likewise the water dispersion colloidal silica.

In the organic solvent dispersion colloidal silica, the type of organic solvent in which colloidal silica is dispersed is not particularly limited. Examples of the organic solvent include lower aliphatic alcohols such as methanol, ethanol, isopropanol, n-butanol and isobutanol; ethylene glycol derivatives such as ethylene glycol, ethylene glycol monobutyl ether and ethylene glycol acetate monoethyl ether; diethylene glycol derivatives such as diethylene glycol and diethylene glycol monobutyl ether; and diacetone alcohol or the like. One type or two or more types selected from the group consisting of these compounds may be used. Toluene, xylene, ethyl acetate, butyl acetate, methyl ethyl ketone, methyl isobutyl ketone, methyl ethyl ketoxime or the like may be used in combination of these hydrophilic organic solvents.

When silica, though it has the aforementioned effect, is combined in an excessive amount, the cured coated film becomes too hard, cracks may be formed. Hence, when silica is used, its amount is 10 to 90 parts by weight and preferably 20 to 85 parts by weight for 100 parts by weight of the silicone resin on the solid basis. When the amount is less than 10 parts by weight, desired coating hardness may not be obtained. On the other hand, when the amount exceeds 90 parts by weight, cracks may be produced.

It is preferable that the inorganic coating composition further comprise a photo-semiconductor material to obtain various functions due to the photocatalytic effect described later and to improve hydrophilicity of a surface of the coated film to be formed and to maintain it for a long period of time by the photocatalytic effect. Examples of the photo-semiconductor material to be used include, but is not limited to, strontium titanate as well as metal oxides such as titanium oxide, zinc oxide, tin oxide, iron oxide, zirconium oxide, tungsten oxide, chromium oxide, molybdenum oxide, ruthenium oxide, germanium oxide, lead oxide, cadmium oxide, copper oxide, vanadium oxide, niobium oxide, tantalum oxide, manganese oxide, cobalt oxide, rhodium oxide, nickel oxide and rhenium oxide, which are desirable in the point that the curing (particularly curing at low temperatures including room temperature) of the coated film is also promoted.

Among these compounds, the above metal oxides are desirable in the point that they are easily usable practically, and titanium oxide is particularly desirable in view of its photocatalytic performance, curing-promoting performance, safety, availability and cost. It is to be noted that when titanium oxide is used as the photo-semiconductor material, those which have anatase type crystal are preferably used because they have the highest photocatalytic performance and curing-promoting performance, and these performances are maintained for a long period of time and developed in a short period of time. These photo-semiconductor materials may be used either singly or in combinations of two or more.

When it is desired for the coated film to be transparent, the average primary particle diameter of the photo-semiconductor material is preferably not more than 50 $\mu$m, more preferably not more than 5 $\mu$m and most preferably not more than 0.5 $\mu$m.

The photo-semiconductor material prior to be dispersed in the coating may have any form such as powder, fine particle powder or solution dispersion sol particle as far as it is dispersible in the coating. Regardless of the above, those having a sol form, especially, at a pH of not more than 7 are highly convenient for use since the curing may proceed in a shorter time. In the case of using those having a sol form, a dispersion medium is preferably an organic solvent in light of the preparation of the coating though it may be either water or an organic solvent.

Moreover, a raw material of the photo-semiconductor material is not particularly limited, as far as it finally exhibits the quality as the photo-semiconductor material.

It is well-known that the photo-semiconductor material, when it is irradiated with ultraviolet rays, creates active oxygen (photo-catalysis). The active oxygen can oxidize and decompose organic materials. Hence, this characteristics can be utilized to obtain the self-cleaning effect in which a carbon type staining component. (e.g., carbon fractions contained in exhaust gas from automobiles and tar from cigarettes) adhered to a coated product is decomposed; the deodorizing effect in which an offensive odor component represented by an amine compound and an aldehyde compound is decomposed; the antibacterial effect in which generation of a bacterial component represented by *coli* bacillus and *Staphylococcus aureus* is prevented; and the mildew-proofing effect. The following effect is also obtained: when a coated film including the photo-semiconductor material is irradiated with ultraviolet rays, the photo-semiconductor material serves to produce hydroxide radicals from water by its photocatalytic action and these hydroxide radicals decompose and remove water-repelling stains, such as organic substances, which is adhered to a surface of the coated film, and hydrophilicity (wettability) of the coated film to water is thereby further improved, whereby, for instance, high level fogging resistance and staining resistance by the aid of the rain water cleaning are obtained and maintained for a long period of time.

Furthermore, the photo-semiconductor material has an antistatic function based on its photocatalytic action, and this function also serves to the staining resistance. For instance, when a coated film of the inorganic coating composition is irradiated with light, the surface resistance of the coated film is reduced by the action of a photo-semiconductor material contained in the coated film to develop antistatic effect and hence a surface of the coated film becomes resistant to stain. Though it is not clearly confirmed the mechanism by which the surface resistance of the coated film is reduced at the time when light is irradiated to the coated film which contains the photo-semiconductor material, it is considered that the surface resistance of the coated film is reduced by the effect of electrons and holes created by the irradiation with light.

When metal is carried on the surface of the photo-semiconductor material, the photocatalytic effect of the photo-semiconductor material is increased. This mechanism is, though not clearly confirmed, considered to be related to the fact that metal is carried on the surface of the photo-semiconductor material, charge separation in the photo-semiconductor material is promoted, and thereby the possibilities of the elapse of electron and holes generated by the charge separation are reduced.

As the metals which may be carried on the surface of the photo-semiconductor material, for example, silver, copper, iron, nickel, zinc, platinum, gold, palladium, cadmium, cobalt, rhodium and ruthenium are preferable because they promote the charge separation in the photo-semiconductor material. Either one type or two or more types of metal may be carried.

The amount of the metal to be carried is not limited to, but is preferably 0.1 to 10% by weight and more preferably 0.2 to 5% by weight on the basis of the photo-semiconductor material. If the amount is less than 0.1% by weight, the effect of carrying becomes insufficient, whereas even if the amount exceeds 10% by weight, the effect is not so much increased and the problems such as discoloration, performance degradation and the like tend to arise on the contrary.

Examples of the method for carrying the metal include, but not limited to, the dipping method, impregnation method and photoreduction method.

Also, a crosslinked clay which carries the photo-semiconductor material between the layers may be used. By introducing the photo-semiconductor material between the layers, the photo-semiconductor material is carried by fine particles whereby the photocatalytic performance is improved.

When the inorganic coating composition also comprises the photo-semiconductor material, the amount of the photo-semiconductor material is 5 to 80 parts by weight and preferably 10 to 50 parts by weight for 100 parts by weight of the silicone resin on the solid basis. Also, when metal is carried on a surface of the photo-semiconductor material, the amount of the metal is 1 to 75 parts by weight and preferably 3 to 45 parts by weight.

When the amount of the photo-semiconductor material is smaller than the above range, there is a tendency that sufficient photocatalytic function may not be obtained. When the amount is larger than the above range, there is a tendency that cracks tend to be produced, for example, thereby reducing the performance of the coated film. The aforementioned amount of the photo-semiconductor material in the case of carrying metal on the surface of the photo-semiconductor material means an amount excluding the carried metal.

The inorganic coating composition can be toned by further comprising colorants such as pigments and dyes.

Preferable examples of the pigment which can be used are, but is not limited to, organic pigments such as carbon black, quinacridone, naphthol red, cyanine blue, cyanine green and Hansa yellow; and inorganic pigments such as titanium oxide, barium sulfate, iron oxide red and complex metal oxides. One type or combinations of two or more types selected from the group consisting of these materials may be used. The pigment may be dispersed using a common method, for example, a method in which pigment powder is directly dispersed by using, but is not limited to, a daino mill or a paint shaker. At this time, dispersing agents, dispersion adjuvants, thickeners and coupling agents may be used. The amount of the pigment is not particularly limited because the masking ability differs depending upon the types of pigment, the amount of the pigment is, for example 5 to 80 parts by weight and preferably 10 to 70 parts by weight for 100 parts by weight of the silicone resin on the solid basis. When the amount is less than 5 parts by weight, the masking ability may become poor, whereas when the amount exceeds 80 parts by weight, there is the case where the smoothness of the coated film is impaired.

Examples of the dye which may be used include, but is not limited to, an azo type, anthraquinone type, indicoid type, sulfide type, triphenylmethane type, xanthene type, alizarin type, acridine type, quinoneimine type, thiazole type, methine type, nitro type or nitroso type dyes. One type or combinations of two or more types selected from the group consisting of these compounds may be used. The amount of the dye is not particularly limited because the masking ability differs depending upon the types of dye, the amount of the dye is, for example 5 to 80 parts by weight and preferably 10 to 70 parts by weight for 100 parts by weight of the silicone resin on the solid basis. When the amount is less than 5 parts by weight, the masking ability may become poor, whereas when the amount exceeds 80 parts by weight, there is the case where the smoothness of the coated film is impaired.

It is to be noted that a leveling agent, metal powder, glass powder, antibacterial agent, antioxidant and ultraviolet absorber or the like may be comprised in the inorganic coating composition to the extent that the effect of the present invention is not adversely affected.

In the inorganic coating composition, it is necessary to adjust the total solid concentration to not more than 5% by weight for the total amount of the coating. Because the total solid concentration of the coating is thin as above, the storage stability of the coating is improved and the coated film is made thin with ease. The formation of a thin film serves to prevent the occurrences of cracks or peeling of the coated film. The total solid concentration of the coating is more preferably not more than 2% by weight and most preferably not more than 1% by weight from these points of view. The lower limit of the total solid content of the coating is preferably 0.001% by weight and more preferably 0.01% by weight. When the total solid concentration of the coating is lower than 0.001% by weight, a function required for the coating becomes poor, or a number of layers must be coated, which is undesirable.

A dilution solvent may be used to adjust the above concentration insofar as it can be mixed with the silicone resin (further with the photo-semiconductor material when it is used). For example, various organic solvents are exemplified. The type of organic solvent is appropriately selected corresponding to the type of a monovalent hydrocarbon contained in each component of the silicone resin or to the molecular weight of each component of the silicone resin.

Examples of such an organic solvent may include, but is not limited to, lower aliphatic alcohols such as methanol, ethanol, isopropanol, n-butanol and isobutanol; ethylene glycol derivatives such as ethylene glycol, ethylene glycol monobutyl ether and ethylene glycol acetate monoethyl ether; diethylene glycol derivatives such as diethylene glycol and diethylene glycol monobutyl ether; and toluene, xylene, hexane, heptane, ethyl acetate, butyl acetate, methyl ethyl ketone, methyl isobutyl ketone, methyl ethyl ketoxime and diacetone alcohol. One type or two or more types selected from the group consisting of these compounds may be used.

A process for preparing the inorganic coating composition is not particularly limited, and each component may be mixed using, for instance, a usual process and apparatus. The form of each component when it is introduced into the coating is not limited to, but for example, may be a liquid as it is, a solution produced by dissolving each component in a solvent, a dispersion solution produced by dispersing each component in a dispersion medium, or a solid including powder.

When each component is introduced in the form of a solution or a dispersion solution, water, the aforementioned organic solvent or a mixture of water and the aforementioned organic solvent, for example, may be used as its solvent or dispersion medium. Each component may be added separately, or two or more components may be mixed in advance. The resulting mixture may be mixed with the remainder components, or all the components may be mixed at the same time. The timing of the addition or mixing of each component is also not particularly limited.

The inorganic coating composition may be produced, for example, by preparing a hydrophilic solution of the inorganic materials, which contain only a tetra-functional alkoxysilane as a polymerizable component and by hydrolyzing and condensation-polymerizing the tetra-functional alkoxysilane in the hydrophilic solution. Incidentally, during the hydrolysis and condensation, other non-polymerizable inorganic materials may be present in the hydrophilic solution.

The hydrolysis and condensation of the tetra-functional alkoxysilane may be performed, for example, by adding water as a curing agent and optionally a catalyst (e.g., one type or two or more types of organic acids and inorganic acids such as hydrochloric acid, acetic acid, silane halide, chloroacetic acid, citric acid, benzoic acid, dimethylmalonic acid, formic acid, propionic acid, glutaric acid, glycolic acid, maleic acid, malonic acid, toluene sulfonic acid and oxalic acid) to the aforementioned hydrophilic solution in each necessary amount (the temperature may be raised as required to (for example, 40 to 100° C.)).

The weight average molecular weight (Mw) of the silicone resin (prepolymer) obtained is controlled to, preferably not less than 800, more preferably not less than 850 and most preferably not less than 900 calculated in polystyrene equivalent. When the distribution of the molecular weight (weight average molecular weight (Mw)) of the silicone resin is smaller than 800, the shrinkage of the silicone resin becomes large when the coated film is cured and cracks may be formed after the coated film is cured.

The amount of water as the curing agent is preferably 0.01 to 3.0 mol and more preferably 1.0 to 2.5 mol per one mol of an alkoxy group of the tetra-functional alkoxysilane.

As the dilution solvent (reaction solvent) used in the hydrolysis and condensation-polymerization reaction of the tetra-functional alkoxysilane, those described as the specific examples of the dispersion medium of the colloidal silica may be used.

The pH of the silicone resin is controlled preferably within a range between 3.8 and 6. If the pH is within this range, the silicone resin can be used stably during which the molecular weight is kept within the above range. If the pH is out of the above range, the stability of the silicone resin becomes poor, and the term for using from which the coating is prepared, is limited.

A pH-adjusting method is not limited to, but in the case where the pH is less than 3.8 when the raw materials of the silicone resin is mixed, the pH may be controlled within the above range by using a basic reagent such as ammonia, whereas in the case where the pH exceeds 6, it may be controlled by using an acidic reagent such as hydrochloric acid. In the case where the reaction hardly proceeds, the molecular weight is kept small, and it takes time to become the molecular weight within the above range, the silicone resin may be heated to promote the reaction; or the pH may be reduced using an acidic reagent to proceed the reaction, the pH then may be returned to a given value by using a basic reagent.

A method for applying the inorganic coating composition to a surface of the base material is not particularly limited. The application method can be selected from various usual applying methods such as brush coating, spray coating, dipping (also called dip coating), roll coating, flow coating (a flow application method in which a coating is flowed from above a coating-receiving portion of a base material), curtain coating, knife coating, spin coating and bar coating.

The coated layer of the inorganic coating composition which is formed on a surface of the base material is heated at low temperature or allowed to stand at room temperature whereby hydrolyzable groups contained in the silicone resin are condensation-reacted among them to form a cured coated film. The inorganic coating composition is not almost affected by moisture even when it is cured at room temperature. Also, if it is subjected to heat treatment, a condensation reaction is promoted to form a cured coated film.

A method for curing the coated layer is not limited to, and may be a well-known method. The temperature for curing is also not limited to, and may be a wide temperature range from room temperature to the temperatures raised by heating depending on the desired performance of the cured coated film and on heat resistance of the photo-semiconductive material and the base material.

The thickness of the cured coated film to be formed may be of the order of 0.01 to 0.5 $\mu$m, which suffices to prevent the occurrence of cracks or peeling. In order to develop various functions of the coated film more efficiently and to shorten curing time at room temperature and in order to keep the cured coated film being bonded or supported stably for a long period of time, the thickness is preferably 0.01 to 0.3 $\mu$m and more preferably 0.01 to 0.1 $\mu$m.

Examples of the base material (which is also a base material used for a hydrophilic coated product of the present invention) to which the inorganic coating composition is applied include, but is not limited to, an inorganic base material, an organic base material, an inorganic/organic composite base material and a coated base material produced by forming at least one inorganic coated film and/or at least one organic coated film on any one of the above organic, inorganic and inorganic/organic composite base material.

Examples of the inorganic base material include, but is not limited to, a metal base material, a glass base material; enamel; a water glass panel; an inorganic construction material such as inorganic cured bodies; and ceramic.

Examples of the metal base material include, but is not limited to, non-ferrous metals [for example, aluminum (JIS-H4000 and the like), aluminum alloys (duralumin and the like), copper, zinc and the like], iron, steel [for example, rolled steel (JIS-G3101 and the like), molten zinc plating steel (JIS-G3302 and the like), (rolled) stainless steel (JIS-G4304, G4305 and the like) and the like], tin plates (JIS-G3303 and the like) and other metals in general (including alloys).

Examples of the glass base material include, but is not limited to, sodium glass, Pyrex glass, quartz glass and non-alkali glass.

The enamel is produced by baking a glassy enamel graze onto a metal surface to coat the surface. Examples of its base metal include, but is not limited to, soft steel plates, steel plates, cast iron and aluminum. The enamel graze is not particularly limited, and those well-known to the art may be employed.

The water glass panel is produced by applying and baking sodium silicate onto a cement substrate such as slate.

The inorganic cured bodies mean base materials in general which are produced by curing and molding inorganic materials. Examples of the inorganic hard bodies include, but is not limited to, fiber reinforced cement plates (JIS-A5430 and the like), ceramic type sidings (JIS-A5422 and the like), cemented excelsior boards (JIS-A5404 and the like), pulp cement plates (JIS-A5414 and the like), slate/cemented excelsior laminated plates (JIS-A5426 and the like), gypsum board products (JIS-A6901 and the like), clay roof tiles (JIS-A5208 and the like), pressed cement roof tiles (JIS-A5402 and the like), clay tiles (JIS-A5209 and the like), masonry concrete block (JIS-A5406 and the like), terrazzo (JIS-A5411 and the like), prestressed concrete double T slabs (JIS-A5412 and the like), ALC panels (JIS-A5416 and the like), hollow prestressed concrete panels (JIS-A6511 and the like) and common bricks (JIS-R1250 and the like).

Examples of the ceramic base material include, but is not limited to, alumina, zirconia, silicon carbide, silicon nitride and the like.

Examples of the organic base material include, but is not limited to, plastic, lumber, wood, paper and the like.

Examples of the plastic base material include, but is not limited to, thermosetting or thermoplastic plastics such as a polycarbonate resin, an acrylic resin, an ABS resin, a vinyl chloride resin, an epoxy resin and a phenol resin and the fiber reinforced plastic (FRP) in which a plastic material is reinforced with organic fibers such as nylon fibers.

Examples of the inorganic/organic composite base material include, but is not limited to, the fiber reinforced plastics (FRP) in which the plastic material is reinforced with inorganic fibers such as glass fibers and carbon fibers.

Examples of the organic coated film which is comprised in the coated base material include, but is not limited to, the cured coated film which is made of the coating material including an acrylic resin, an alkyd resin, a polyester resin, an epoxy resin, an urethane resin, an acryl silicone resin, a rubber chloride resin, a phenol resin, or a melamine resin.

Examples of the inorganic coated film which is comprised in the coated base material include, but is not limited to, the cured coated film which is made of the coating material including an inorganic resin such as a silicone resin.

When the inorganic coating composition is applied to a base material, there is the case where desired adhesiveness and weather resistance are hardly obtained depending on the qualities and surface condition of the base material (particularly, in the case of that an inorganic coating composition to which a photo-semiconductor material is added, is coated on an organic base material). Therefore, a primer layer may be formed in advance on a surface of the base material before the coated film is formed by applying and curing the inorganic coating composition. The primer layer may be organic or inorganic and is not particularly limited. Examples of the organic primer layer include a cured resin layer of an organic primer composition which contains at least one organic resin selected from the group consisting of a nylon resin, an alkyd resin, an epoxy resin, an acrylic resin, an organic modified silicone resin (e.g., an acrylic silicone resin), a rubber chloride resin, an urethane resin, a phenol resin, a polyester resin and a melamine resin in an amount of not less than 10% by weight as a solid. Examples of the inorganic primer layer include a cured resin layer of an inorganic primer composition which contains an inorganic resin such as a silicone resin in an amount of not less than 90% by weight as a solid. A particularly preferable primer layer is that formed from a silicone type material in the form of aqueous emulsion.

The thickness of the primer layer is not limited to, but for instance, is preferably 0.1 to 50 μm and more preferably 0.5 to 10 μm. If the thickness is too thin, the desired adhesiveness or weather resistance may not be achieved, if the thickness is too thick, foams may occur on drying.

Incidentally, a base material provided with at least one organic primer layers and/or the inorganic primer layers on the surface thereof is included in the category of the coated base material. In other words, the coated film provided on a surface of the coated base material may be the primer layer.

Also, the primer layer may include colorants such as pigments and dyes as required for color toning. Examples of the colorants include, the colorants mentioned above as those which can be added to the inorganic coating composition. A preferable range of the amount of the colorant to be combined in the primer layer is the same as in the case of the inorganic coating composition. However, although the amount is on the solid basis, it is defined based on 100 parts by weight of the total resin in the total amount of the primer composition.

Examples of the form of the base material include, but is not limited to, film form, sheet form, plate form and fibrous form. Also, the base material may be molded bodies of the materials having these forms or structural bodies provided with at least one of the materials having these forms and their molded materials as a part thereof.

The base material may be those comprising each of the aforementioned various materials singly, or composite materials produced by combining at least two materials among the aforementioned various materials, or laminate materials produced by laminating at least two materials among the aforementioned various materials.

A hydrophilic inorganic coated film (which is also a coated film that the hydrophilic coated product of the present invention possesses) formed according to the process for forming a hydrophilic inorganic coated film of the present invention is placed in a part of various materials or products, whereby it is used appropriately in the following applications:

materials and products relating to buildings such as armoring materials (e.g., external wall materials and roofing tiles such as plate roof tiles, Japan roof tiles and metal roof tiles), drainspouts such as drainspouts made of a resin, e.g., vinyl chloride drainspouts and drainspouts made of metal, e.g., stainless drainspouts, gates and materials used for the gates (e.g., the doors of gates, gate posts and gate fences), fences and materials used for the fences, garage doors, home terraces, doors, pillars, car ports, ports for parking bicycles, signposts, home delivery posts, wiring accessories, e.g., distribution panels and switches, gas meters, intercommunication systems, door-phones and camera lens portion of televisions, electric keys, entrance poles, porches, diffusers of ventilators and glass for buildings; windows (e.g., lighting windows, skylights, movable windows, e.g., louvers) and materials used for them (e.g., window frames, storm doors and blinds), automobiles, rolling stocks, airplanes, ships, machines, peripheral materials on roads (e.g., sound insulating walls, interior plates of tunnels, various display units, guard rails, buffer stops, balustrades, sign plates and sign poles of traffic control signs, signals and postcones), advertising towers, indoor or outdoor lightning equipment and materials used for the equipment (e.g., materials comprising at least one material selected from the group consisting of glass, resins, metals and ceramics), glass for solar cells, vinyl and glass houses for agriculture, outdoor machines for air conditioners and VHF, UHF, BS and CS antennas.

It is to be noted that although the inorganic coating composition may be applied directly to at least a part of the aforementioned various materials and products and cured, its use is not limited to this and, for example, the inorganic coating composition may be applied to the surface of a film base material and cured to form a hydrophilic film, which is then applied to at least a part of the aforementioned various materials and products. Examples of the material used for such a film base material include, but is not limited to, resins such as a polyethylene terephthalate (PET) resin, a polybutylene terephthalate (PBT) resin, a vinyl chloride resin, an acrylic resin, a fluororesin, a polypropylene (PP) resin and a composite resin of these resins.

EXAMPLES

The present invention will be hereinafter explained in detail by way of examples and comparative examples. In these examples and comparative examples, all designations of [parts] and [%] indicate [parts by weight] and [weight percentage (wt. %)], respectively, as far as it is otherwise specifically indicated. In addition, the molecular weight was measured by means of GPC (gel permeation chromatography) using a measuring instrument, HLC8020 (Tosoh Corporation) as a converted value based on a calibration curve made using standard polystyrene. It is noted that the present invention is not limited to the examples described below.

Example 1

75 parts of isopropanol as a dilution solvent was added to 50 parts of tetraethoxysilane, 50 parts of tetraisopropoxysilane and 100 parts of isopropanol-dispersion-organosilica sol (trade name: OSCAL1432, manufactured by Shokubai Kasei Kogyo K.K., solid content: 30%) as acidic colloidal silica. To the mixture was further added 100 parts of water, followed by stirring. The resulting solution was heated at 60° C. for 5 hours in a thermostat whereby the weight average molecular weight (Mw) of a hydrolyzed and condensation-polymerized substance which was the reaction product was controlled to 1500 to 1800 to obtain an alcohol solution of the hydrolyzed and condensation-polymerized substance.

Condition for preparing an alcohol solution of the hydrolyzed and condensation-polymerized substance:

| [Water/hydrolyzable group X] mol ratio | 1.24 |
|---|---|
| Weight average molecular weight | 1500–1800 |
| Converted solid content of total condensate compound | 14.9% |

1000 parts of isopropanol as a dilution solvent was further added to and mixed with this solution to obtain an inorganic coating composition (1). In this coating, the total solid concentration for the total amount of the coating was 4.1%.

The inorganic coating composition (1) soon after it was prepared was applied to a glass substrate washed with acetone by a spray coating method. The coated film was dried for 0.5 hour at room temperature to cure and thereafter it was baked at 150° C. for one hour to obtain a hydrophilic coated product (1). The thickness of the coated film after it was cured was 0.2 μm.

Example 2

100 parts of methanol as a dilution solvent was added to 10 parts of tetramethoxysilane, 100 parts of tetraethoxysilane and 30 parts of methanol-dispersion-silica sol (trade name: MT-ST, manufactured by Nissan Kagaku Kogyo K.K., solid content: 30%) as acidic colloidal silica. To the mixture was further added 60 parts of water, followed by stirring. The resulting solution was heated at 60° C. for 5 hours in a thermostat whereby the weight average molecular weight (Mw) of a hydrolyzed and condensation-polymerized substance which was the reaction product was controlled to 1800 to 2000 to obtain an alcohol solution of the hydrolyzed and condensation-polymerized substance.

Condition for preparing an alcohol solution of the hydrolyzed and condensation-polymerized substance:

| [Water/hydrolyzable group X] mol ratio | 1.03 |
|---|---|
| Weight average molecular weight | 1800–2000 |
| Converted solid content of total condensate compound | 13.9% |

1000 parts of isopropanol as a dilution solvent was added to and mixed with this solution and as a photo-semiconductor material, a titanium oxide sol (titanium oxide sol manufactured by Shokubai Kasei Kogyo K.K., trade name: QUEEN TITANIC 11-1020G) in an amount of 20 parts for 100 parts of the sum of the total condensate compound and the total photo-semiconductor material component on the solid basis to obtain an inorganic coating composition (2). In this coating, the total solid concentration for the total amount of the coating was 4.7%.

The inorganic coating composition (2) soon after it was prepared was applied to a glass substrate washed with acetone by a spray coating method. The coated film was dried for 0.5 hour at room temperature to cure and thereafter it was baked at 150° C/. for one hour to obtain a hydrophilic coated product (2). The thickness of the coated film after it was cured was 0.2 μm.

Example 3

A hydrophilic coated product (3) was obtained in the same manner as in Example 1 except that a flow application method in which a coating was flowed from the upper portion of a base material was used as the coating method in place of the spray coating method.

Example 4

The same operations as in Example 1 were performed, except that an aluminum substrate was used as the base material in place of the glass substrate, to obtain a hydrophilic coated product (4).

Example 5

An inorganic coating composition (5) was obtained in the same manner as in Example 2 except that the amount of the titanium oxide sol used as the photo-semiconductor material was altered to 5 parts. In this coating, the total solid concentration for the total amount of the coating was 3.59%.

The inorganic coating composition (5) soon after it was prepared was applied to a glass substrate washed with acetone by a spray coating method. The coated film was dried for 0.5 hour at room temperature to cure and thereafter it was baked at 150° C. for one hour to obtain a hydrophilic coated product (5). The thickness of the coated film after it was cured was 0.2 μm.

Example 6

An inorganic coating composition (6) was obtained in the same manner as in Example 2 except that the amount of isopropanol used as the dilution solvent was altered to 3000 parts and the amount of titanium oxide sol used as the photo-semiconductor material was altered to 80 parts. In this coating, the total solid concentration for the total amount of the coating was 3.69%.

The inorganic coating composition (6) soon after it was prepared was applied to a glass substrate washed with acetone by a spray coating method. The coated film was dried for 0.5 hour at room temperature to cure and thereafter it was baked at 200° C. for one hour to obtain a hydrophilic coated product (6). The thickness of the coated film after it was cured was 0.1 μm.

Example 7

An inorganic coating composition (7) was obtained in the same manner as in Example 2 except that titanium oxide carrying platinum was used as the photo-semiconductor material in the same amount in place of the titanium oxide sol. In this coating, the total solid concentration for the total amount of the coating was 4.7%.

Incidentally, platinum was carried on titanium oxide powder (titanium oxide manufactured by Ishihara Sangyo K.K.: trade name: ST-01) by a photo-deposition method in an amount of 0.5% for the titanium oxide.

Next, using the inorganic coating composition (7) soon after it was prepared, the same procedures were carried out to obtain a hydrophilic coated product (7).

Example 8

A hydrophilic coated product (8) was obtained in the same manner as in Example 1 except that a dip coating method was used as the coating method in place of the spray coating method.

Example 9

The inorganic coating composition (1) obtained in Example 1 soon after it was prepared was applied to a window glass (1 m², thickness: 6 mm) of a building on the premises of Matsushita Denko K.K. at Kadoma in Osaka by using a flow application method so that the thickness of the cured coated film was 0.04 μm and was cured by drying day and night at room temperature to obtain a hydrophilic coated product (9).

Example 10

An aluminum substrate was washed with acetone and a silicone type coating agent (trade name: FLESSELA N, manufactured by Matsushita Denko K.K.) was applied to a surface of the aluminum substrate, followed by drying, to obtain a 1.5-μm-thick primer layer. The inorganic coating composition (1) was applied to this primer layer, dried and cured in the same manner as in Example 1 to obtain a hydrophilic coated product.

Example 11

An aluminum substrate was washed with acetone and an aqueous silicone type coating agent (trade name: FLESSELA AQUEOUS TYPE manufactured by Matsushita Denko K.K.) was applied to a surface of the aluminum substrate, followed by drying, to obtain a 1.5-μm-thick primer layer. The inorganic coating composition (1) was applied to the primer layer, dried and cured in the same manner as in Example 1 to obtain a hydrophilic coated product.

Comparative Example 1

A comparative inorganic coating composition (1) was obtained in the same manner as in Example 1 except that methyltrimethoxysilane was used in the same amount in place of tetraisopropoxysilane. In this coating, the total solid concentration for the total amount of the coating was 5.00%.

Using the comparative inorganic coating composition (1) soon after it was prepared, the same procedures as in Example 1 were performed to obtain a comparative coated product (1).

Comparative Example 2

A comparative inorganic coating composition (2) was obtained in the same manner as in Example 1 except that the amount of isopropanol which was added as the dilution solvent after an alcohol solution of the hydrolyzed and condensation-polymerized material was obtained was altered to 500 parts. In this coating, the total solid concentration for the total amount of the coating was 6.38%.

Using the comparative inorganic coating composition (2) soon after it was prepared, the same procedures as in Example 1 were performed to obtain a comparative coated product (2).

Comparative Example 3

The same procedures as in Example 1 were carried out, except that the film thickness of the coated film after it was cured was altered to 0.6 μm, to obtain a comparative coated product (3).

Comparative Example 4

The same procedures as in Example 1 were carried out, except that the film thickness of the coated film after it was cured was altered to 0.007 μm, to obtain a comparative coated product (4).

Comparative Example 5

A comparative inorganic coating composition (5) was obtained in the same manner as in Example 1 except that 100 parts of methyltrimethoxysilane was used instead of 50 parts of tetraethoxysilane and 50 parts of tetraisopropoxysilane. In this coating, the total solid concentration for the total amount of the coating was 5.00%.

The film performance of the resulting coated product were evaluated by the following methods.

Method of evaluation (1) Adhesiveness

This was evaluated by the boiling test described in JIS-K5400.

(2) Surface Hydrophilicity (Wettability to Water)

This was evaluated by measuring the contact angle between the coated film and water before ultraviolet lays were applied. The measurement of the contact angle was made by dropping 0.2 cc of distilled water on the surface of the coated film and thereafter by observing using a magnifying camera. It is understood that the smaller the contact angle, the higher the hydrophilicity is.

(3) Storage Stability of the Coating

The prepared coating was stored at 25° C. while it was subjected periodically to a film forming ability test. The test was made by examining whether or not the coated layer formed by spray coating was made into a coated film. Storage period (days) until the stored coating was not made into a coated film was used for evaluation. The results of evaluation of (1) to (3) are shown in Table 1.

TABLE 1

| Example number | Adhesiveness[a] | Surface hydrophilicity | Storage stability of coating |
|---|---|---|---|
| Example 1 | 10 points | 0° | 90 days or more |
| Example 2 | 10 points | 0° | 90 days or more |
| Example 3 | 8 points | 0° | 90 days or more |
| Example 4 | 8 points | 5° | 90 days or more |
| Example 5 | 10 points | 0° | 90 days or more |
| Example 6 | 8 points | 5° | 90 days or more |
| Example 7 | 10 points | 0° | 90 days or more |
| Example 8 | 8 points | 0° | 90 days or more |
| Example 9 | 10 points | 5° | 90 days or more |
| Example 10 | 8 points | 0° | 90 days or more |
| Example 11 | 8 points | 0° | 90 days or more |
| Comparative Example 1 | 10 points | 80° | 90 days or more |
| Comparative Example 2 | 10 points | 0° | 40 days |
| Comparative Example 3 | 4 points | — | 90 days or more |
| Comparative Example 4 | 10 points | 25° | 90 days or more |
| Comparative Example 5 | 10 points | 80° | 90 days or more |

[a]The points in the evaluation of adhesiveness was calculated according to JIS-K5400.

As seen in Table 1, the coated films of the examples all had a contact angle lower than 5 degrees for water after the film was formed even when they were not irradiated with ultraviolet rays, showing that they had good hydrophilicity. Also, the ability for retaining hydrophilicity was as high as 300 hours or more in terms of retainable time.

On the contrary, the coated films of Comparative Examples 1 and 5 were formed of a silicone resin containing trifunctional alkoxysilane as a polymerizable component and was not hence hydrophilic.

Also, as to the storage stability of the coating, all of the paints of the examples in which the total solid concentration for the total amount of the coating was not more than 5% by weight were easily made into a coated film even after they were stored for one month and also this coated film had almost the same performance as a coated film formed from the coating soon after it was prepared. On the other hand, the coating of Comparative Example 2 in which the total solid concentration for the total amount of the coating exceeded 5% by weight could not be even made into a coated film after it was stored for one month.

Also, all coated films of the examples which had a film thickness ranging from 0.01 to 0.5 μm after they were cured were superior in both adhesiveness and hydrophilicity, whereas the coated film of Comparative Example 3 which had a film thickness exceeding 0.5 μm after it was cured was inferior in adhesiveness. The coated film of Comparative Example 4 which had a film thickness less than 0.01 μm posed no problem in adhesiveness, but its hydrophilicity was insufficient.

The coated films of Examples 10 and 11 were applied as a primer layer to a base material provided with a silicone type coated film of an aqueous emulsion type. Therefore, the coating material was well-applied and good film-forming ability was obtained.

EFFECT OF THE INVENTION

The hydrophilic inorganic coated film formed according to the process of the present invention has surface hydrophilicity (wettability to water) from the first after the film is formed and it can thereby exhibit staining-resistance by the aid of rain water and fogging resistance. Also, the development of these performances requires no irradiation with ultraviolet rays. Therefore, even if it is applied to the place that are not irradiated with ultraviolet rays, or even if the product which is coated with the coated film is used at the place that are not irradiated with ultraviolet rays, the performances can be obtained. The weather resistance, the durability and the strength are also excellent.

Moreover, the aforementioned coated film is formed in a thickness as thin as 0.01 to 0.5 μm and hence cracks and peeling are scarcely caused.

Also, in the process for forming a coated film according to the present invention, the total solid concentration in the inorganic coating composition used is controlled to a concentration as low as not more than 5% by weight for the total amount of the coating. Hence, even if the coating is stored for a long period of time after it is prepared, the hardening and deterioration of the coating can be restrained and hence the pot life is markedly prolonged thereby improving the storage stability of the coating.

Furthermore, because the aforementioned inorganic coating composition is an inorganic type, the performances of the coated film is scarcely damaged by addition of various additives such as photo-semiconductor materials.

It is therefore possible to form a hydrophilic coated film which is resistant to deterioration caused by ultraviolet rays. Also, the inorganic coating composition can be toned to various colors, allowing a high grade of design and wide range applications.

The inorganic coating composition used in the above process for forming a hydrophilic inorganic coated film allows not only heating curing but also curing at room temperature and can be hence used in a wide range of drying curing conditions or in wide temperature conditions. Therefore, the inorganic coating composition can be applied not only to base materials having shapes which do not permit uniform heating, base materials having a large size or base materials having inferior heat resistance but also in the case where heat is applied with difficulty likewise in the case of performing coating operations outdoors or the like. It therefore has high industrial value.

What is claimed is:

1. A hydrophilic inorganic coated film formed by applying to a surface of a base material, followed by drying and curing, an inorganic coating composition which contains as a major component a silicone resin, wherein
the silicone resin is obtained by hydrolyzing and condensation-polymerizing only the tetra-functional alkoxysilane represented by formula (I):

$$Si(OR)_4 \qquad (I)$$

wherein R represents an alkyl group having 1–7 carbon atoms and wherein said silicone resin has combined therewith 10 to 90 parts by weight of colloidal silica for 100 parts of said silicone resin;

the total solid content of the inorganic coating composition is not more than 5% by weight; and the film thickness of the hydrophilic inorganic coated film is 0.01 to 0.5 μm.

2. A process for forming a hydrophilic inorganic coated film on a surface of a base material, the process comprising the steps of:

(1) preparing an inorganic coating composition which contains, as a major component, a silicone resin obtained by hydrolyzing and condensation-polymerizing only the tetra-functional alkoxysilane represented by formula (I):

$$Si(OR)_4 \qquad (I)$$

wherein R represents an alkyl group having 1–7 carbon atoms or an aryl group, and combining therewith 10 to 90 parts by weight of colloidal silica for 100 parts of said silicone resin, wherein said inorganic coating composition has a total solids content of not more than 5% by weight;

(2) applying the inorganic coating composition to a surface of the base material to form a coated layer; and (3) drying and curing the coated layer to form a cured coated film having a thickness of 0.01 to 0.5 μm.

3. The process according to claim 2, wherein the R is one or more members selected from the group consisting of a methyl group, an ethyl group, a propyl group, an isopropyl group, a butyl group, an isobutyl group, a t-butyl group, and a phenyl group.

4. The process according to claim 2, wherein solids content of the inorganic coating composition further comprises a photo-semiconductor material.

5. The process according to claim 4, wherein the photo-semiconductor material is present in an amount of 5 to 80 parts by weight for 100 parts by weight of the silicone resin in the solids portion of the inorganic coating composition.

6. The process according to claim 4, wherein the photo-semiconductor material consists essentially of titanium oxide.

7. The process according to claim 2, wherein the base material has a primer coated film on the surface thereof to which the inorganic coating composition is applied.

8. The process according to claim 7, wherein the primer coated film is formed from an aqueous emulsion of a silicone type material.

9. The process according to claim 2, wherein the base material is selected from the group consisting of metal, glass, enamel, ceramic, cement, concrete, wood, plastic, and inorganic fiber reinforced plastic.

10. The process according to claim 2, wherein the coating is performed by a method selected form the group consisting of a flow coating method, a spray coating method, a roll coating method, a brush coating method, a spin coating method, a dip coating method, a continuous-flow coating method, a curtain coating method, a knife coating method, and a bar coating method.

* * * * *